United States Patent [19]

Syväkari

[11] 4,283,172
[45] Aug. 11, 1981

[54] HOT ISOSTATIC PRESSURE FURNACE WITH ENHANCED INSULATION PROPERTIES

[75] Inventor: Pertti Syväkari, Helsingborg, Sweden

[73] Assignee: ASEA Aktiebolag, Vesteras, Sweden

[21] Appl. No.: 72,316

[22] Filed: Sep. 4, 1979

[30] Foreign Application Priority Data

Sep. 6, 1978 [SE] Sweden ................................ 7809364

[51] Int. Cl.³ ........................ F27D 1/00; F27D 23/00; F27B 5/04
[52] U.S. Cl. .................................... 432/247; 110/336; 432/205; 432/249
[58] Field of Search ........................ 432/205, 247, 249; 266/252; 110/336

[56] References Cited

U.S. PATENT DOCUMENTS

| | | | |
|---|---|---|---|
| 3,790,339 | 2/1974 | Larkèr et al. | 432/249 |
| 3,993,433 | 11/1976 | Isaksson et al. | 432/249 |
| 4,013,394 | 3/1977 | Witkin et al. | 432/249 |

FOREIGN PATENT DOCUMENTS 2004626  4/1979  United Kingdom ..................... 432/247

Primary Examiner—John J. Camby

[57] ABSTRACT

A high-pressure furnace having a pressure chamber which includes an insulating mantle which encloses the furnace space, the insulating mantle itself including an inner tube which has at least one layer of felt-like, fibrous insulating material mounted on the side which faces the furnace space.

7 Claims, 4 Drawing Figures

HOT ISOSTATIC PRESSURE FURNACE WITH ENHANCED INSULATION PROPERTIES

BACKGROUND OF THE INVENTION

1. Field of the Invention

The present invention relates to a cylindrical, elongated furnace, preferably a vertical furnace, for treatment of material at high pressures and high temperatures. Furnaces of this kind are used, among other things, for the sintering of metal powder which is contained in a gas-tight capsule and, separated from a pressure gas, is compressed at such a high temperature that the powder is bonded together below the melting temperature; for the treatment of castings, i.e., such that voids are eliminated; and for the joining together of metal pieces. Furnaces for hot isostatic pressing are disclosed in more detail in, for example, U.S. Pat. No. 3,598,378.

2. The Prior Art

In high-pressure furnaces the furnace space must be insulated from the walls of the surrounding pressure chamber since, considering the strength of the material from which the walls are made, these walls must be maintained at a relatively low temperature. In addition, the furnace space must be well insulated with regard to heat losses so as to be able to achieve the desired temperature with a reasonable supply of power. However, the thickness of the insulation must be kept low in view of the fact that the pressure chamber space is expensive and the cost of the pressure chamber rises significantly with increasing diameter. The very high temperatures often used, e.g., normally 1000° C. and more, and the simultaneous high gas pressures, e.g., normally 500 bar and more, involve problems which are very difficult to cope with from the point of view of insulation. The insulation is in fact a very important part of the furnace.

Conventional furnaces normally contain a furnace insulation with a cylindrical mantle having a number of concentric tubes and with layers of insulating material in the gaps between the tubes and, sometimes, outside the outermost tube. In prior art furnaces the inner surface of the innermost tube has always been bare, i.e. uninsulated, because of the difficulties in attaching the insulating material satisfactorily on the side of the furnace space. Particularly in furnaces designed for extremely high temperatures, i.e., 1400° C. and more, the high temperature has involved very difficult problems; particular problems have been caused by deformations due to high temperatures.

It is an object of the present invention to provide a hot isostatic pressure furnace which has even better insulation properties than prior art furnaces of this type.

SUMMARY OF THE INVENTION

According to the present invention, the innermost tube in the insulating mantle is provided on its inner surface with one or more layers of a felt-like, fibrous insulating material, these layers being pressed against the inner surface of the tube facing the furnace space and maintained in position by a number of clamping rings. These clamping rings rest on a number of support pins which are mounted on the innermost tube, and they are suitably divided. When applied to the insulating mantle, the rings are given such a diameter that the layer of insulating material is compressed to a certain extent, suitably to a degree of about 75% of its original thickness. At the joint between the rings, the clamping rings are formed with or provided with locking elements which lock the ring ends in a desired position with respect to each other, thus obtaining an overall desired ring diameter.

Also according to the invention, the rings are covered with a layer of insulating material having a somewhat larger width than that of the ring, which insulating material is fixed on either side of the ring. The fixing agent may consist of a glue or another adhesive, or may consist of mechanical elements such as pins, wires or clamps of a heat-resistant material. The insulating material inside the clamping rings constitutes radiation protection which limits the heating of the rings. In this way, the temperature difference between the rings and the tube located outside these rings is also limited. The compression of the layer of insulating material, caused by different thermal expansion due to temperature differences, is then also limited. The stresses on the insulating material are limited and the life is increased.

According to the invention, the inner tube of the insulating mantle is also suitably provided with a separate sheet-metal lid. This is joined in a gas-tight fashion to the inner tube. On the lower side, this lid is provided with one or more layers of a felt-like, fibrous insulating material. This layer is supported by metal rings or plates which are suspended in the lid by fixing elements, such as pins or links. The inner, hat-formed portion of the insulating casing around the furnace space, consisting of the inner tube of the mantle with lid and insulating material, constitutes an exchangeable unit which may be separated from the other parts of the casing.

The invention will be better understood by reference to the accompanying drawings and the following detailed description.

DETAILED DESCRIPTION OF THE PREFERRED EMBODIMENT

Figure 1:
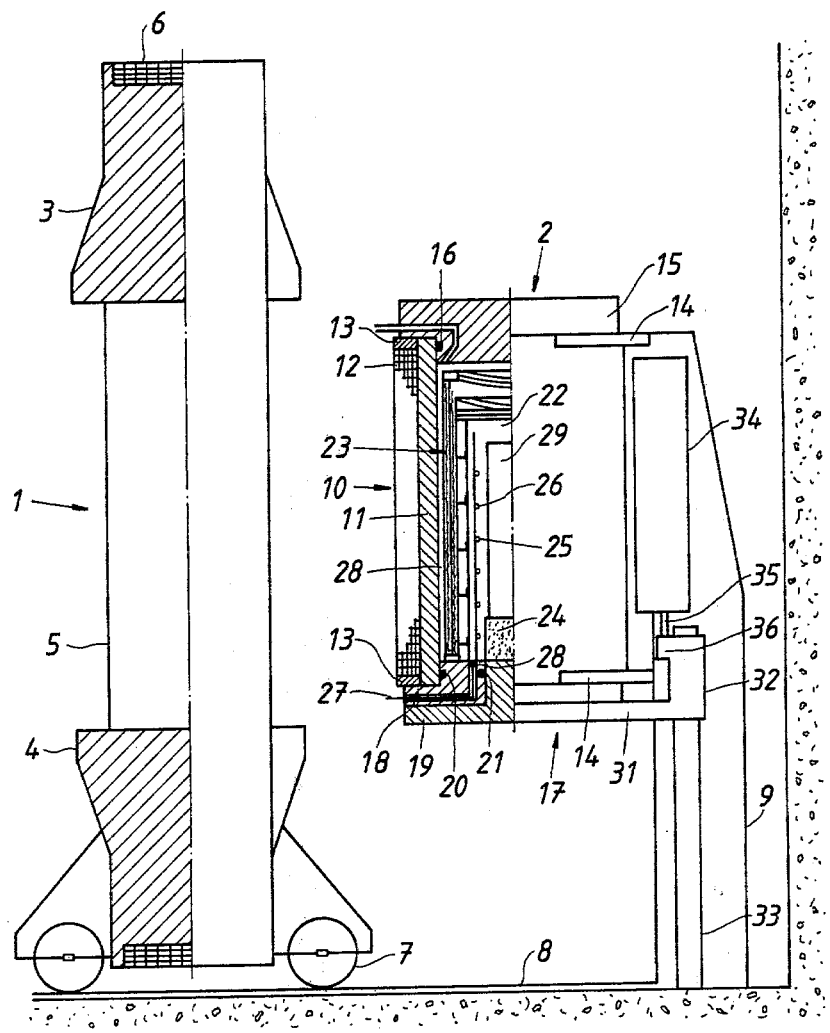
FIG. 1 schematically shows a side view, partially in section, of a pressure furnace with a press stand for taking up axial forces in accordance with the present invention.

As is clearly indicated in FIG. 1, a press stand, generally indicated as 1, is capable of being movably positioned from the position shown to a position where it surrounds a pressure chamber, generally indicated as 2. The press stand 1 is the type which includes yokes 3 and 4, intermediate spacers 5, and a prestressed strip sheath 6 which retains the elements together. The stand 1 is supported for movement by wheels 7 that run on rails 8. The chamber 2 comprises a high-pressure cylinder, generally indicated as 10, which is constructed of a tube 11, a surrounding prestressed strip sheath 12, and end rings 13 which retain the strip sheath in an axial direction. These end rings 13 also serve as attachments for brackets 14 such that the chamber 2 is fixed to the column 9. The chamber 2 has an upper end closure 15 which is inserted into one end of the tube 11 of the high-pressure chamber 2. Between the end closure 15 and the end of the tube 11 is a seal 16. The other end of the chamber has a lower end closure 17 which consists of an annular outer bottom portion 18, this portion 18 being suspended from the cylinder 10 and projecting into the other end of tube 11. An inner bottom portion 19 includes a portion which passes within the opening in annular portion 18. A seal 20 is located between the tube 11 and the annular bottom portion 18, and a seal 21 is located between the bottom portions 18 and 19. The furnace space 22 is surrounded by an insulating casing which consists of a hat-shaped portion 23 that rests on the bottom portion 18 but may be suspended from the upper end closure 15, and an insulating bottom plate 24 that rests on the bottom portion 19. In addition, there is a heater 25 with heating elements 26 located inside the insulated casing, the heater resting on the annular bottom portion 18. Electrical current is supplied to the heater 25 via a lead 27 at the bottom portion 18 which passes through a seal 28. The billet 29 which is to be treated is positioned to rest on bottom plate 24.

The bottom portion 19 is connected via bracket 31 to a sleeve 32 which is capable of moving along the guide means 33 which is fixed to column 9. The sleeve 32, and thus the bottom portion 19, can be moved along guide means 33 and thus raised and lowered by the operating cylinder 34 which is operatively connected to sleeve 32 at bracket 36 by piston rod 35.

Figure 2:
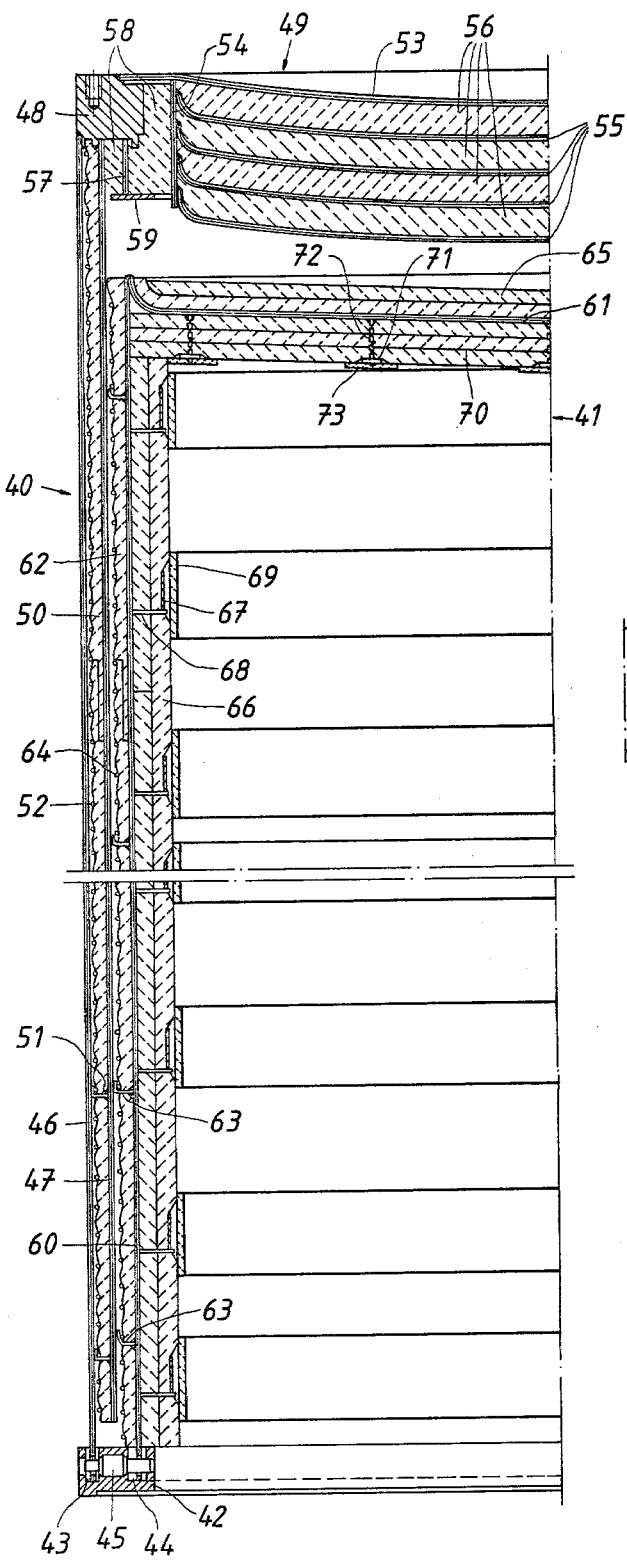
FIG. 2 shows an enlarged partial side view of an insulating mantle used in the pressure chamber of FIG. 1, FIG. 3 schematically shows a view of a joint of a clamping ring used in the insulating mantle shown in FIG. 2, and FIG. 4 schematically shows an enlarged vertical section through the inner tube of the insulating mantle of FIG. 2 at a point where a clamping ring is located.

The hat-shaped portion 23 of the insulated casing can be better seen in FIG. 2. It consists of an outer hat-shaped unit 40 and an inner hat-shaped unit 41 which are both carried by a common bottom ring 42 which rests on the annular portion 18 of the lower end closure 17 (FIG. 1). This ring 42 is formed with guide slots 43 and 44 and with locking pins 45.

The outer portion 40 of the hat-shaped portion 23 is constructed of two concentric tubes 46 and 47, a ring 48, and a lid 49, as well as insulating material. Tubes 46 and 47 are joined in gas-tight fashion to the ring 48. Tube 47 is surrounded by a layer of insulating material 50 which is attached to the tube 47 by fixing pins 51 and tapes 52. The lid 49 is constructed of a curved sheet 53, which is joined in a gas-tight fashion to the ring 48, a vertical sheet metal ring 54, and a number of plates 55 with insulating material 56 therebetween. Two sheet rings 59 and 57 are suspended from the ring 48, and the spaces between these rings and the lid 49, as well as between the rings and the tube 47, are filled with insulating material 58.

The inner portion 41 is constructed of a sheet tube 60, a lid 61 (which is joined in a gas-tight fashion to the tube 60), and layers of insulating felt-type material on both sides of the tube 60 and the lid 61. The insulating material 62 on the outer side of the tube 60 is attached by pins 63 and tapes 64. The insulating material 65 is loosely placed in several layers on lid 61. The insulation 66 on the inner side of the tube 60 consists of two layers and is pressed against the tube 60 by a number of clamping rings 67. These rings 67 are supported by pins 68 which are fixed to the inner side of the tube 60. These pins 68 also assist in supporting the insulation 66. The rings 67 have such a diameter that they compress the insulating material 66 to about 75% of its original thickness. The rings 67 are covered on the side thereof opposite the side which faces tube 60 with a strip 69 of insulating material which is fixed to the insulation 66 by a glue, or by suitable pins or clamps. The insulation 70 on the lower side of the lid 61 consists of several layers and is supported by rings or plates 71 which are suspended from the lid 61 by means of chains 72. These rings or plates 71 are covered with plates 73 of insulating material.

Figure 3:
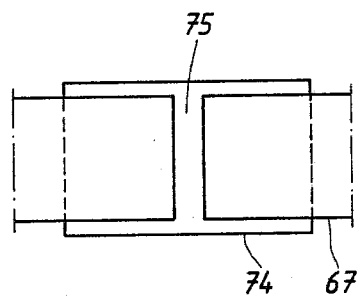

The clamping rings 67 are divided so that they may be located in such a manner as to compress the material in the insulation 66 on the inner side of the tube 60. As shown in FIG. 3, a sheet 74 may be placed inside the ring 67 at the opening and ring 67 may be expanded to the desired diameter, whereafter the sheet 74 and the ring 67 are joined, for example, by being riveted or screwed or welded together. It is also possible to insert spacers in a gap 75, which give the ring 67 the desired diameter.

Figure 4:
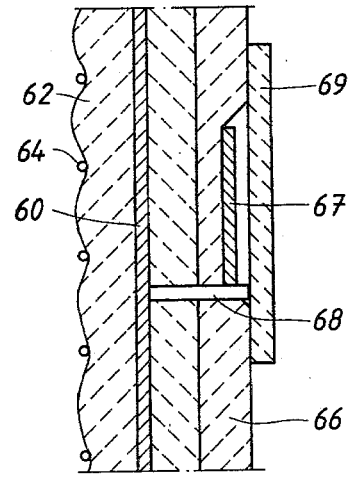

FIG. 4 shows on an enlarged scale a section through the hat-formed portion 41 at the area around a clamping ring 67.

While there has been shown and described an embodiment of the present invention, it is obvious that modifications will occur to those of ordinary skill in the art and still be within the scope of the present invention as defined in the appended claims.

I claim:

1. In a cylindrical, elongated furnace for the treatment of materials at high temperatures and in a gaseous atmosphere under high pressure, said furnace comprising a cylindrical pressure chamber which includes a high-pressure cylinder in which is located a furnace space; end closures projecting into the opposite ends of the high-pressure cylinder; force-absorbing members for absorbing axial forces exerted on the end closures; and an insulating mantle positioned between the high-pressure cylinder and the internally-located furnace space, said insulating mantle including an innermost concentric tube nearest said furnace space, at least one outermore concentric tube enclosing said innermost concentric tube, an insulating material located between said innermost concentric tube and the nearest said outermore concentric tube, an insulating lid and an insulating bottom, the improvement wherein the said innermost concentric tube includes a number of clamping rings on the inner side thereof facing said furnace space and wherein at least one layer of felt-like insulating material is positioned against said inner side of said innermost concentric tube by said clamping rings.

2. The furnace in accordance with claim 1 wherein two layers of insulating material are positioned against the inner side of said innermost concentric tube.

3. The furnace in accordance with claim 1 wherein each of said clamping rings includes a number of support pins connected to said innermost concentric tubes so that each said clamping ring can be positioned to compress said felt-like insulating material against the inner side of said innermost concentric tube to less than its original thickness.

4. The furnace in accordance with claim 3 wherein said clamping rings are mounted to said innermost concentric tube to be separated from one another along the longitudinal direction of said innermost concentric tube, and wherein locking means are provided for attaching the rings at their points of separation.

5. The furnace in accordance with claim 4 wherein said locking means permits adjustment of the distance said clamping rings are from the inner side of said innermost concentric tube such that the overall diameter determined by said rings can be adjusted, this adjustment providing the desired compression of said insulating material.

6. The furnace in accordance with claim 1 wherein an additional lid is joined in a gas-tight fashion to said innermost concentric tube of the insulating mantle, wherein the additional lid includes a number of plates suspended therefrom towards the furnace space, wherein at least one layer of insulating material is supported by said plates to be positioned against said additional lid and between said additional lid and the furnace space, and wherein an additional layer of insulating material is located between the plates and the furnace space.

7. The furnace in accordance with claim 1 wherein said innermost concentric tube of said insulating mantle and the layers of insulating material positioned thereagainst are removable as a unit from the insulating mantle.

* * * * *